No. 684,516. Patented Oct. 15, 1901.
G. D. LEECHMAN.
AUTOMOBILE VEHICLE.
(Application filed Mar. 21, 1901.)
(No Model.) 2 Sheets—Sheet 1.
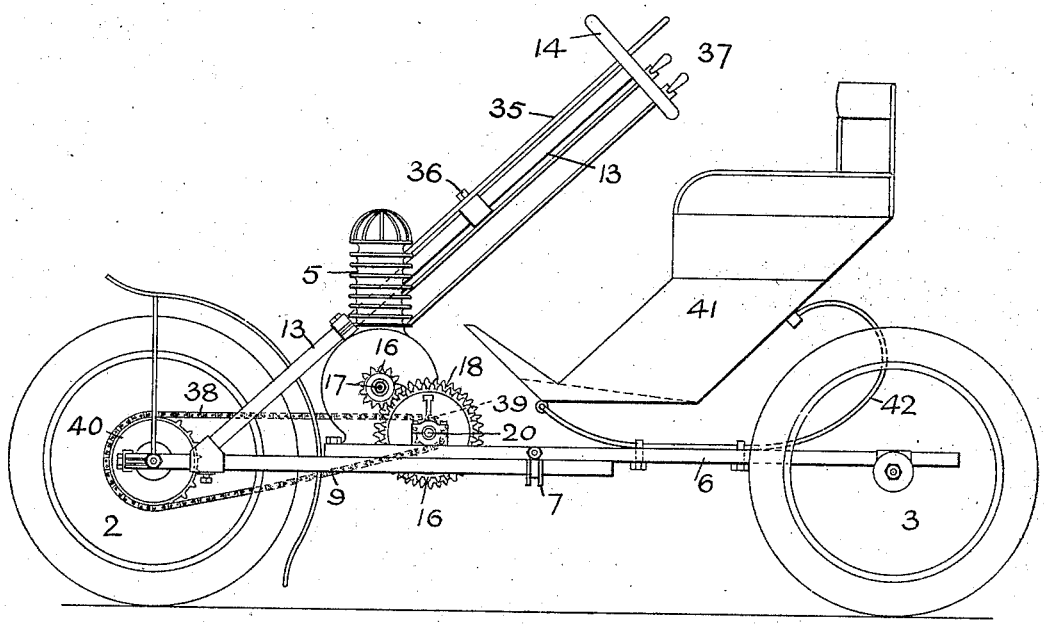
FIG. I.
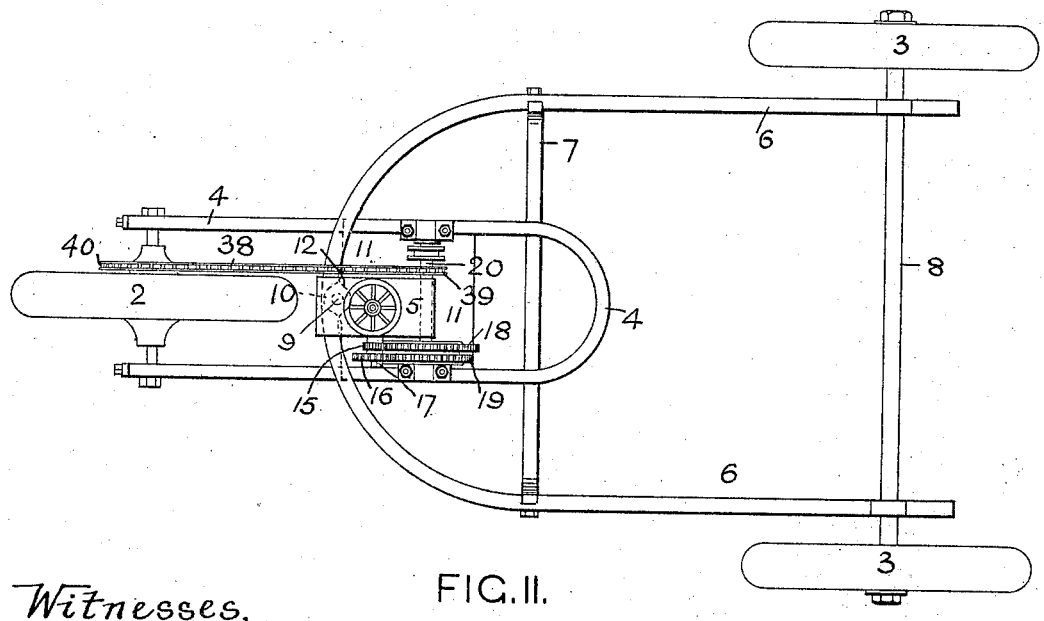
FIG. II.
Witnesses,
Thos. J. Wilson.
John J. Fazakarley.
Inventor,
G. Douglas Leechman.

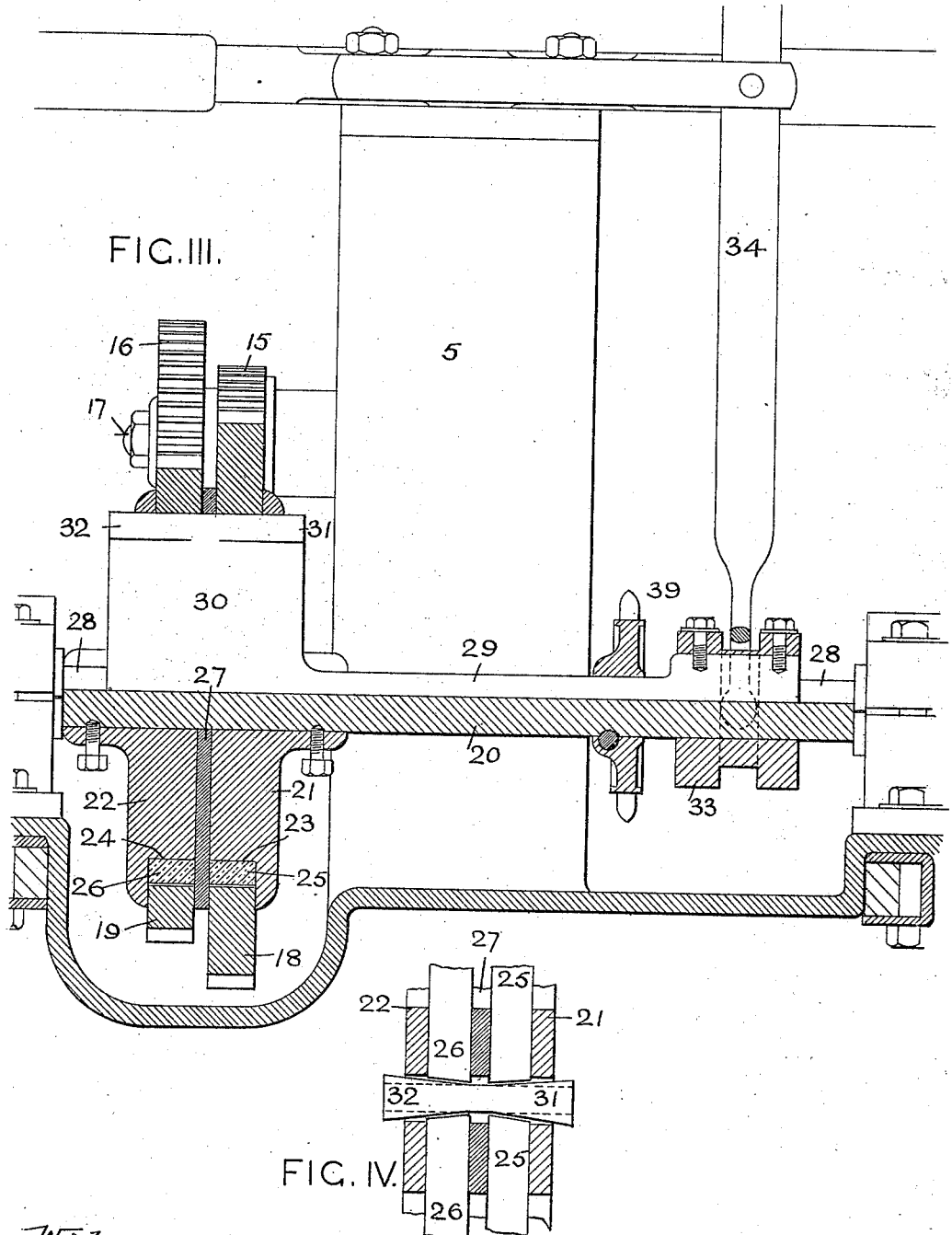

UNITED STATES PATENT OFFICE.

GEORGE DOUGLAS LEECHMAN, OF COVENTRY, ENGLAND.

AUTOMOBILE VEHICLE.

SPECIFICATION forming part of Letters Patent No. 684,516, dated October 15, 1901.

Application filed March 21, 1901. Serial No. 52,223. (No model.)

*To all whom it may concern:*

Be it known that I, GEORGE DOUGLAS LEECHMAN, a subject of the King of Great Britain, residing at Coventry, county of Warwick, England, have invented a new and useful Automobile Vehicle, of which the following is a specification.

My invention has for its object to produce an automobile vehicle capable of carrying two persons side by side and combining efficiency with cheapness of construction to a higher degree than hitherto attained; and my invention consists, essentially, in a three-wheeled automobile vehicle having a single wheel, which serves both as a driving-wheel and a steering-wheel, arranged in front and carried in a horizontal or approximately horizontal frame, the rear part of which carries the motor and rests upon a transverse member of a second frame. The said second frame is connected to a pair of wheels at the back and in front rests upon and is pivoted to an intermediate part of the first frame.

Other features of my invention appear in the following description, and the whole are clearly defined in the claims.

In the accompanying drawings, Figure I is a side elevation of the vehicle. Fig. II is a plan showing certain parts of the same. Fig. III is a transverse section through the counter-shaft. Fig. IV is a plan of part of the variable-speed gear.

The same numerals indicate the same parts throughout the drawings.

In carrying out my invention I employ a single front wheel 2 and two back wheels 3 3. The wheel 2 is mounted in the forward end of a horizontal or approximately horizontal frame 4, which may be conveniently constructed of a length of channel-iron bent to U form in plan. The gasolene or other suitable motor 5 is mounted upon the rear part of the frame 4 behind the wheel 2, and the said rear part of the frame is adapted to bear upon the transverse member 7 of a second frame 6. The frame 6 also may be arranged horizontally or approximately horizontally and be constructed of a length of channel-iron bent to U form in plan. The wheels 3 3 are connected to the rear end of the frame 6, being preferably mounted loosely on a common stationary axle 8, bolted or otherwise suitably secured to the said frame. The front portion of the frame 6 bears upon an intermediate part of the frame 4 and is pivoted thereto by a pin 9, standing perpendicular to the frame 4. The said pin may be conveniently mounted in a boss 10, cast on the base 11 of the motor, and in a boss 12, mounted on the frame 6. Antifriction devices of any suitable nature may be introduced, if desired, between the parts having relative movements in steering. Any suitable steering-gear may be employed, such as a lever 13, fixed to the frame 4 and motor 5. The said lever may be provided with a non-rotating wheel-handle 14.

The driving-gear may consist, as shown, of two pinions 15 16, fixed to the motor-shaft 17 and gearing permanently with the spur-rings 18 19, mounted loosely and indirectly on the counter-shaft 20. To the counter-shaft 20 are fixed two disks 21 22, having shoulders 23 24. On each shoulder is mounted a split ring 25 26. The splits in the rings are tapered in plan. Between the disks 21 22 is introduced a plate 27 of greater diameter than the split rings. The spur-rings 18 19 are mounted on the split rings 25 26 and are retained laterally by the disks 21 22 and the plate 27. The counter-shaft 20 has a radial slot 28, in which lies a key 29. The said key has a radial extension 30, which the disks 21 22 and the plate 7 are slotted to receive. The extension 30 carries two wedges 31 32, which lie in the splits in the rings 23 24. Suitable means are employed for shifting the key lengthwise, such as the grooved collar 33, secured to the other end thereof, and the forked lever 34, engaging the said collar. The lever 34 may be actuated by another lever 35, pivoted at 36 on the steering-lever 13. The handle of the lever 35 may project through the wheel 14, the spokes of the wheel being so arranged as to give clearance for the movement of the said lever. The levers 37 for controlling the motor may be mounted on the wheel 14.

The rings 23 24 are turned slightly smaller than the bore of the spur-rings 18 19, so that when the parts are in the position shown in Fig. III both spur-rings are free to revolve on the shoulders of the respective disks 21 22 and the motor can work without driving the vehicle. To throw in the low speed, the key 29 is moved toward the left, so as to force the wedge 31 in between the ends of the ring 25. As the wedge is forced in, the friction between the split ring 25 and the spur-ring 18 is gradually increased until the former is obliged to turn with the latter and the counter-shaft 20 is rotated. To obtain the higher speed, the key 29 is moved toward the right, so as to first withdraw the wedge 31 (thus releasing the spur-ring 18) and then force in the wedge 32 between the ends of the spur-ring 26 until the said ring is gripped by the split ring and the counter-shaft 20 is again rotated, but at the higher speed. The rotary movement of the counter-shaft 20 may be transmitted to the driving-wheel by a chain 38, running over chain-wheels 39 40, fixed to the counter-shaft 20 and the driving-wheel 2, respectively, or by other suitable means.

The body 41 may be of any suitable construction and is mounted on the rear frame 6, preferably through the medium of springs, such as 42.

What I claim as my invention, and desire to secure by Letters Patent of the United States, is—

1. In an automobile vehicle, the combination of a first frame, a second frame having a transverse member, a motor, and a pivotal connection between the said first and second frames, one end of the second frame being adapted to bear upon an intermediate part of the first frame, and one end of the first frame being adapted to carry the motor and bear upon the transverse member of the second frame, substantially as set forth.

2. In an automobile vehicle, the combination of a first frame, a second frame having a transverse member, a motor, a pivotal connection between the said first and second frames, a single wheel, and a pair of running wheels; one end of the second frame being adapted to bear upon an intermediate part of the first frame and the other end of the said second frame being connected to and supported by the pair of running wheels; one end of the first frame being adapted to carry the motor and bear upon the transverse member of the second frame, the other end of the said first frame being connected to and supported by the single wheel, substantially as set forth.

3. In an automobile vehicle, the combination of a first frame, a second frame having a transverse member, a motor, a pivotal connection between the said first and second frames, a single wheel, a pair of running wheels, a steering-lever, and a body; the said steering-lever being fixed to the first frame, and the said body to the second frame; one end of the second frame being adapted to bear upon an intermediate part of the first frame and the other end of the said second frame being connected to and supported by the pair of running wheels; one end of the first frame being adapted to carry the motor and bear upon the transverse member of the second frame, the other end of the said first frame being connected to and supported by the single wheel, substantially as set forth.

4. In an automobile vehicle, the combination of a driving-wheel, a motor having a rotating shaft, pinions fixed to the said motor-shaft, a counter-shaft, split rings rotating with the said counter-shaft, spur-rings mounted loosely on the said split rings and gearing with the said pinions, wedges rotating with the counter-shaft and lying between the ends of the split rings, means for moving the said wedges laterally relatively to the said split rings, and means for transmitting rotary motion from the counter-shaft to the driving-wheel, substantially as and for the purpose set forth.

5. In an automobile vehicle, the combination of a driving-wheel, a motor having a rotating shaft, pinions fixed to the said motor-shaft, a counter-shaft, disks fixed to the said counter-shaft and having shoulders, split rings mounted on the said shoulders, spur-rings mounted loosely on the said split rings, a plate introduced between the said split rings, a radial slot cut in the said counter-shaft, a key movable lengthwise in the said slot and having a radial extension, wedges mounted on the said extension and lying between the ends of the split rings, a grooved collar fixed to the said key, a forked lever engaging the said collar, means for actuating the said forked lever, and means for transmitting rotary motion from the counter-shaft to the driving-wheel, substantially as and for the purpose set forth.

6. In an automobile vehicle, the combination of a motor, a steering-lever adapted to move with the said motor, a wheel-handle fixed to the said steering-lever and motor-controlling levers mounted on the said wheel-handle, substantially as set forth.

7. In an automobile vehicle, the combination of a motor, a steering-lever adapted to move with the said motor, a wheel-handle fixed to the said steering-lever, a variable-speed gear, and a hand-lever adapted to operate the said variable-speed gear and projecting up through the said wheel-handle, substantially as set forth.

In testimony whereof I have signed my name to this specification in the presence of two subscribing witnesses.

G. DOUGLAS LEECHMAN.

Witnesses:
THOS. F. WILSON,
JOHN HAZAKARLEY.